Dec. 1, 1964     O. HERMANN     3,159,043

CONTROL ARRANGEMENT FOR A SHIFTABLE TRANSMISSION

Filed May 29, 1961     2 Sheets—Sheet 1

INVENTOR.
OTTO HERMANN

BY Toulmin & Toulmin

ATTORNEYS

Dec. 1, 1964   O. HERMANN   3,159,043
CONTROL ARRANGEMENT FOR A SHIFTABLE TRANSMISSION
Filed May 29, 1961   2 Sheets-Sheet 2
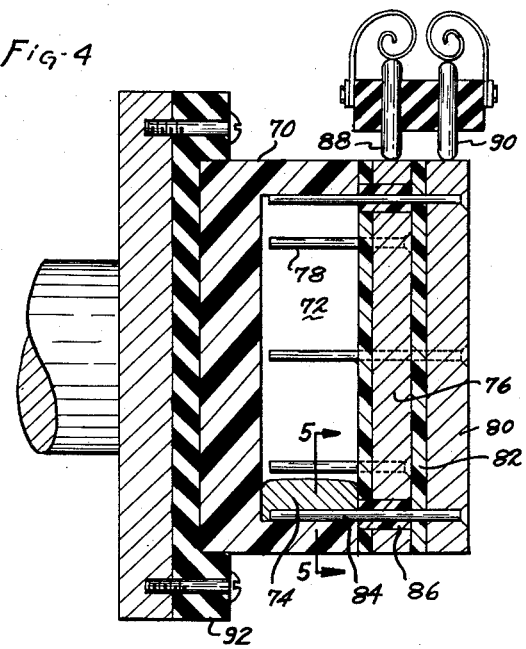
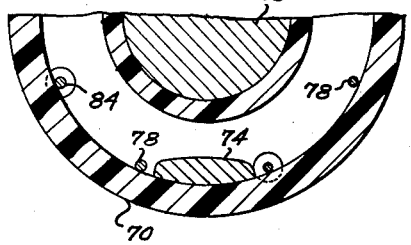
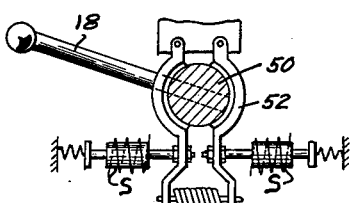
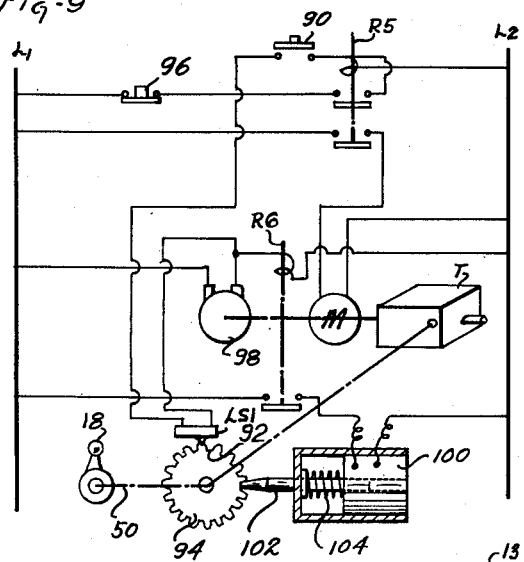
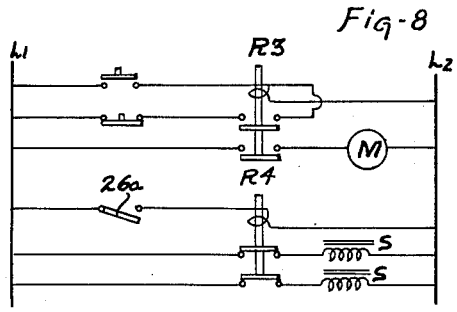
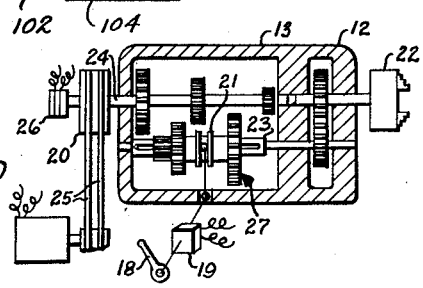
INVENTOR.
OTTO HERMANN
BY Toulmin & Toulmin
ATTORNEYS

United States Patent Office 3,159,043
Patented Dec. 1, 1964

3,159,043
CONTROL ARRANGEMENT FOR A SHIFTABLE TRANSMISSION
Otto Hermann, Cincinnati, Ohio, assignor to The R. K. Le Blond Machine Tool Company, Cincinnati, Ohio, a corporation of Delaware
Filed May 29, 1961, Ser. No. 113,373
10 Claims. (Cl. 74—336.5)

This invention relates to the control of the shifting of a transmission and is particularly concerned with such a control in connection with the transmission of a machine tool of the nature of a lathe or the like.

In many instances, particularly in the case of machine tools and the like, it is most desirable to be able to determine the instant when a rotating shaft comes to a halt. This might be desired, in connection with a lathe, for example, in order to determine the instant at which the gears of the lather headbox or some other part thereof could be safely shifted.

In my copending application Serial Number 63,740, filed October 20, 1960, now Patent No. 3,094,595, issued June 18, 1963, I show a zero speed switch which is particularly useful for effecting this determination, namely, a determination of the exact instant at which a shaft comes to a halt. In that application, there is illustrated a manner in which the indication of the halting of the shaft could be employed for controlling the shifting of a gear headbox of a lathe.

The present application is by way of being a continuation-in-part of the aforementioned application and shows in greater detail an interlock between the shifting mechanism and the lathe headbox and a zero speed switch carried by a driven shaft of the lathe so that shifting of the gears of the lathe is impossible until the rotation of the shafts thereof have come to a halt. This positively prevents any accidental shifting of the gears which could lead to considerable damage, and forms an arrangement that is ideally adapted for being incorporated in an automatic gear shifting arrangement which, of course, can only become effective when the driving of the gear box is interrupted and the gears therein come to a halt.

Having the foregoing in mind, it becomes a primary object of the present invention to provide an improved control for the shifting of the gears of a gear transmission, such as the gear box of a lathe headstock.

A still further object of this invention is the provision of an arrangement incorporating a zero speed electric switch in a shifter control for a transmission.

Still another object of this invention is the provision of an arrangement for incorporating a bidirectional zero speed switch in a transmission shift control mechanism.

Another particular object in this invention is the provision of a control for controlling the shifting of a transmission which can readily be incorporated in existing manufacture as well as being readily adapted for incorporation in new manufacture.

The foregoing objects, as well as still other objects and advantages of the present invention, will become more apparent upon reference to the following specification taken in connection with the accompanying drawings in which:

FIGURE 4 is a vertical sectional view similar to FIGURE 2 showing a modified form of the switch;

FIGURE 5 is a sectional view similar to FIGURE 3 but it is indicated by line 5—5 on FIGURE 4;

FIGURE 6 is a more or less diagrammatic view showing one form of brake arrangement for locking the shifter mechanism during the time that the gears in the transmission are rotating;

FIGURE 8 is a diagrammatic electrical circuit similar to FIGURE 7 but showing the manner in which the modified switch arrangement of FIGURES 4 and 5 could be incorporated therein;

FIGURE 9 is a diagrammatic representation showing the manner in which a positive lock could be employed for positively locking the shifter mechanism of the transmission and also indicating an interlock which would prevent energization of the transmission drive motor except when a shifting operation has been completed; and FIGURE 10 is a more or less diagrammatic cross sectional view of a geared headstock, having shiftable means therein and, incorporating the principles of the present invention.

Figure 1:
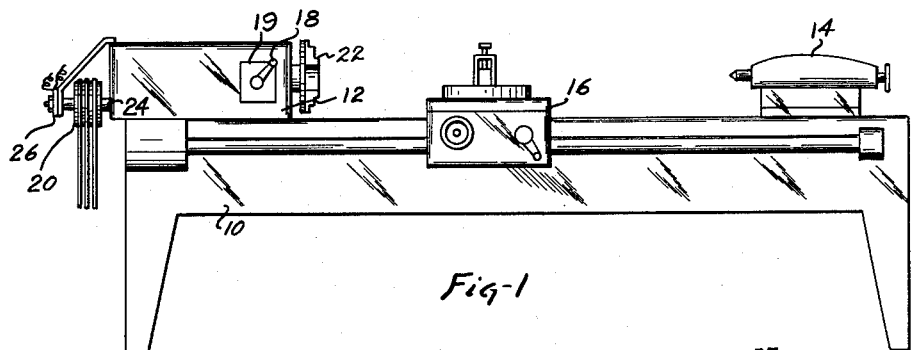
FIGURE 1 is a more or less diagrammatic view showing a relatively simple lathe arrangement incorporating a shifter control and a zero speed switch according to the present invention.

Referring to the drawings somewhat more in detail, the lathe in FIGURE 1 comprises a bed 10, a headstock 12, a tailstock 14, and a carriage 16. The headstock 12 has a gear box which is a geared transmission and there is included a shifting arrangement such as the manually shiftable lever 18 by means of which the drive ratio of the transmission in the headstock can be changed. The adjustment of the shiftable lever 18 will change the drive ratio between the motor driven pulley 20 and the spindle 22 of the head stock so as to determine the speed of rotation of the spindle thereby to obtain the desired cutting speed at the surface of a work piece supported by the spindle.

Associated with shiftable lever 18 is a lock arrangement illustrated more or less diagrammatically at 19 in FIGURE 1 which, in accordance with this invention, is so constructed and arranged as to prevent shifting of the lever 18 at any time that the input shaft 24 is rotating. Input shaft 24 is adapted for being driven by belts 25 passing over pulley 20 and which belts also pass about a pulley driven by main drive motor M.

According to this invention, a zero speed switch 26 is mounted on one of the elements which rotates when motor M is energized, in this case, on the input shaft 24, and this switch is connected in an electric control circuit which circuit is effective for preventing movement of lever 18 except when the pulley 20 and shaft 24 are, therefore, the spindle 22 are not rotating.

In one form of the zero speed switch, the switch is normally closed and then in another form of the zero speed switch it is normally open. With a normally closed switch, the switch is open whenever it is rotating and only closed when it comes to a complete halt and, with the normally open switch, whenever the switch is rotating it is closed and does not open until it comes to a complete halt.

Figure 3A:
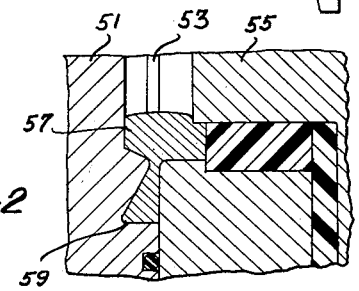
FIGURE 3a is a view showing a modified arrangement of the zero speed switch having a delay feature built therein.
Figure 2:
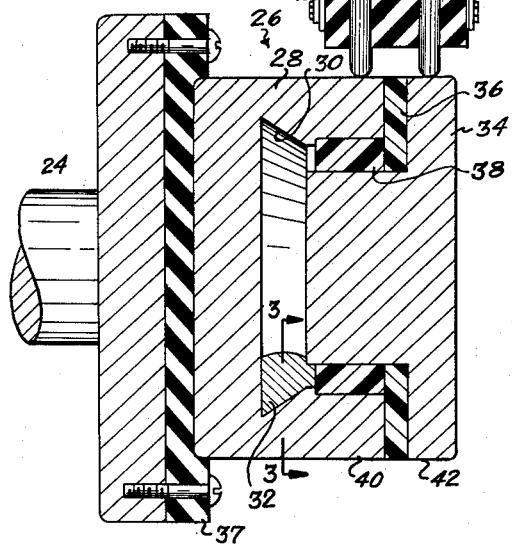
FIGURE 2 is a vertical sectional view through one form of the zero speed switch.
Figure 3:
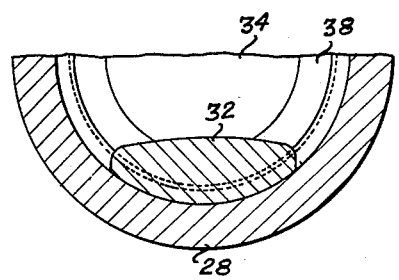
FIGURE 3 is a transverse sectional view indicated by line 3—3 on FIGURE 2.

The normally closed form of the switch is illustrated in FIGURES 2 and 3. In these figures will be noted that the switch comprises a metal body part 28 and a groove 30 therein in which there is a pool of mercury 32.

A small metal part at 34 is mounted in body part 28 with an insulating ring 36 interposed therebetween. An insulating bushing or sleeve 38 extends between the axial portions of the body parts.

A disc 37 attached to body part 28 provides means for supporting the switch on the rotating member or shaft 24 while simultaneously insulating all parts of the switch from the shaft, each of the body parts 28 and 34 has a smooth annular surface thereon, as at 40 and 42, and on which smooth annular surfaces, brushes or current collectors 44 and 46 ride so that electrical connection can be made with the switch while it is rotating. Spring means at 45 and 47 may be employed for urging the brushes into engagement with the said annular surfaces.

As it will be seen FIGURES 2 and 3, the pool of mercury at 32 is of such a size that it will bridge between and electrically connect the body parts 28 and 34 when the switch is stationary thus establishing electrical connection between the brushes 44 and 46. As soon as the switch commences to rotate, however, the pool of mercury commences to flatten out on account of the centrifugal forces acting thereon, and at quite a low speed of rotation of the switch, the bridging electrical connection between the body parts 28 and 34 will be interrupted.

The pool of mercury eventually flattens out into a thin ring of mercury inside the groove 30 and will again form pool at the bottom of the switch that will bridge between the electrically conductive body parts of the switch only when the shaft and switch have again come to a halt.

According to the present invention, the shifter lever 18 is attached to a shaft 50 and, to prevent movement lever 18 and shaft 50, except when the spindle drive shaft 24 is at a complete halt, there is provided a brake arrangement 52 associated with shaft 50.

This brake arrangement is illustrated in FIGURE 6. The brake arrangement is arranged to include a spring 54 which normally causes engagement of shaft 50 by the brake arrangement so that the shaft 50 cannot be rotated. Also associated with the brake arrangement are the solenoids S, attached to the individual shoes of the brake arrangement which, when energized, cause the brake shoes to move outwardly against the bias of spring 54 thereby releasing the shaft so that it can be shifted. This brake is the control indicated generally at 19 in FIGURE 1.

As will become more evident hereinafter, particularly in connection with the description of FIGURE 8, other detaining means could be provided for the shifter, including positively engaging detaining means, so that it will be understood that the particular brake arrangement illustrated is purely exemplary and it is not intended in any way to limit the scope of the present invention.

It will also be evident that there could be multiple elements to be locked in place or otherwise controlled by the zero speed switch so that it is intended that such multiple control arrangements are to be included within the scope of the present invention. In many machine tool gear boxes, for example, there are a plurality of shiftable levers and it is, of course, desirable within the purview of the present invention to control each and every one of the shifting levers so that absolutely no shifting of any of the gears of the transmission could take place until the transmission is brought to a halt as indicated by the zero speed switch of the present invention.

Figure 7:
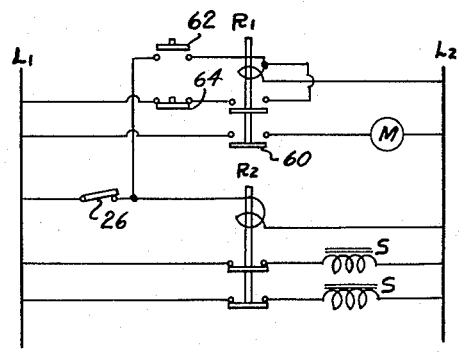
FIGURE 7 is a diagrammatic electrical circuit showing the manner in which the brake of FIGURE 6 could be controlled by a zero speed switch arrangement according to the FIGURES 2 and 3 modification.

FIGURE 7 shows a simple electrical control circuit in which the normally closed switch of FIGURES 3 and 4 and the brake of FIGURE 6 can be interrelated. In this circuit, the power lines are indicated at L1 and L2 and connected therebetween is a first relay R1 having a blade 60 in circuit with drive motor M that drives the drive belts passing over the pulley 20. A second relay R2 has normally open blades in circuit with the solenoids S of the brake. The zero speed switch that has been described is indicated at 26.

In the circuit of FIGURE 7, motor M can be energized by closing start switch 62. As soon as the motor starts, the switch 26 will open and will deenergize relay R2 which will cause deenergization of solenoids S whereupon the brake 52 will close and lock shifter shaft 50 in place. Shaft 50 will remain locked by brake 52 until motor M is halted by actuating stop switch 64 which will deenergize relay R1 thus deenergizing motor M.

When motor M comes to a complete halt, thus halting pulley 20 and shaft 24 and the transmission, switch 26 will close thereby energizing relay R2 which will, in turn, energize solenoids S in order to release brake 52 to permit shifting of the transmission.

Returning to the normally open switch of FIGURES 4 and 5, it will be seen in these figures that the switch comprises an outer body part 70 of electrical insulating material which has therein a cavity 72 adapted for receiving a pool of mercury at 74. At the open end of the cavity there is an electrically conductive ring 76 carrying conductive pins 78 which extends inwardly in the cavity axially at the periphery thereof and in circumferentially spaced relation. The pins carried by ring 76 are spaced apart peripherally a distance which is somewhat greater than twice the peripheral length of the pool of mercury in the cavity when the switch is stationary.

There is also included in the switch construction a second and electrically conductive ring spaced and insulated from ring 76 by a washer 82 of electrical insulating material. Ring 80 also carries electrically conductive pins 84 which extend through ring 76 inside the insulating bushings 86. Pins 84 also extend axially into the cavity 72 at periphery thereof and have the same circumferential spacing as the pins 78 and are positioned midway therebetween.

As will be seen in FIGURE 5, the pins are so spaced that the pool of mercury 74 cannot bridge between any two adjacent pins except when the pool of mercury is flattened out by rotation of the switch. The switch of this modification is therefore open at zero speed and is closed when it is rotating.

As in connection with the first described zero speed switch, the rings 76 and 80 have pertaining thereto, brush elements 88 and 90 for effecting electrical connection with the switch. The body part 70 of the switch is mounted on a disc 92 of electrical insulating material providing means for mounting the switch on a supporting rotating member, such as a shaft, while simultaneously insulating the switch from its supporting member.

The circuit of FIGURE 8 illustrates how the normally open zero speed switch of FIGURES 4 and 5 could be embodied in an electrical circuit that includes the brake 52 of FIGURE 6.

In FIGURE 8, motor M is connected between power lines L1 and L2 and the energization thereof is under the control of a relay R3. Solenoids S of the brake are under the control of relay R4 which has blades that close when the relay is deenergized for energizing the solenoids S and which blades open when the relay is energized to energize the solenoids S.

The zero speed switch indicated in FIGURE 8 by the reference numeral 26a is in circuit with the energizing coil of relay R4. It would be evident that when the rotation of the switch is halted, the switch will open and relay R4 will be deenergized thus bringing about energization of the solenoids S to release brake 50 so that the shifting operation can be carried out.

When the motor is again energized and the transmission commences to rotate, switch 26a will close thus energizing relay R4 and opening its blades thereby to deenergize solenoids S thus permitting brake 52 to close on shaft 50 and to hold shaft 50 against rotation.

From the foregoing, it will be evident that the present invention provides for a simple, inexpensive, and compact zero speed electrical switch arrangement equally effective in both directions of rotation and adapted for easily being incorporated in a transmission arrangement, such as a lathe headbox, for controlling the shifting thereof.

In the modification of FIGURE 9 there is shown an arrangement similar to those that have been described previously except the FIGURE 9 modification shows a positive lock for a shifting lever together with an interlock which prevents energization of the main drive motor except when a shifting operation has been completed.

In FIGURE 9 the power lines are indicated at L1 and L2 and connected therebetween is relay R5 which has a blade in circuit with main drive motor M for the transmission T. Relay R5 is under the control of a switch 90 which is arranged in series with a normally open limit switch LS1. This limit switch has an actuating element 92 arranged to be engaged by the teeth of a member 94 fixed on shaft 50 so as to turn therewith when the shaft is moved by the adjusting or shifting lever 18. It is only when the switch LS1 is closed by engagement with one of the teeth, indicating that the lever 18 is in properly shifted position that switch LS1 will close and permit energization of relay R5.

Upon deenergization of relay R5, by opening stop switch 96, the blade of the relay in circuit with motor M will open and motor M will accordingly be deenergized, and will come to a halt. When the motor comes to a halt the zero speed switch 98 will close and this will cause energization of relay R6 which has a blade in circuit with a solenoid 100 pertaining to latch plunger 102. Latch plunger 102 is normally urged by spring 104 into engagement with a space between a pair of the teeth of member 94 thereby positively holding the member in position. When solenoid 100 is energized however, the plunger 102 is retracted from member 94 and this will permit turning of shaft 50 to change the setting of transmission T.

In the circuit of FIGURE 9, the switch 98 could either be normally open or normally closed and, should the switch be of the normally open type, the relay R6 would be normally closed instead of normally open as illustrated.

It will be appreciated that the arrangement of FIGURE 9 is actually substantially identical with the previously identified circuits except for the provision of the interlock provided by switch LS1 which prevents the motor M from becoming energized following the halting thereof except when the shift lever 18 is in a properly adjusted position.

It will also be evident that the control arrangement of FIGURE 9 could be extended to the control of a plurality of shifter shafts instead of merely to one, merely by connecting the several electrical elements in parallel except for the switches LS1 pertaining to the several shifter shafts which would, in the case of a plurality of shifter shafts, be connected in series.

The modification of FIGURE 3a is a normally closed zero speed switch in which the two parts of the body 51 and 55, which are bridged by the body of mercury 57, are so arranged that when the switch is rotating, the body of mercury is contained within a groove 59. When the switch slows down and halts, the movement of the mercury into position to connect the body parts is restricted by the relatively narrow opening 53 so that an automatic delay feature with respect to the closing of the switch is had thereby preventing the switch from accidentally closing before the transmission comes to a complete halt.

FIGURE 10 illustrates more or less diagrammatically the details of the conventional geared headstock 12 of FIGURE 1 with its shiftable elements in a neutral position, and shows the manner in which the shiftable lever 18 and lock arrangement 19 are operably connected to shifting fork 21. The transmission has a frame 13. In operation, one of the plurality of drive gears keyed to input shaft 24, which is driven by belts 25, drivingly engages one of the cluster of shiftable gears 27 splined to countershaft 23. Locking arrangement 19 locks shiftable lever 18 against movement thereof when the transmission is in operation. Countershaft 23 is driven by input shaft 24 through gears 27 thereby driving rotary spindle 22. When it is desired to change the rotational speed of the spindle 22, input shaft 24 is halted, thus halting rotary zero speed switch 26 whereupon lock arrangement 19 automatically releases shiftable lever 18, as previously described, permitting lever 18 to be shifted, thereby shifting one of the gear cluster 27 on splined shaft 23 in driving engagement with one of said gears of input shaft 24 completing the selection of the desired spindle speed. Upon restarting the transmission switch 26 will commence to turn and lock arrangement 19 will again lock lever 18. Stopping of the transmission can be accomplished merely by de-energizing the drive motor therefor or a clutch may be interposed between the drive motor and the transmission and opened to halt the transmission. In any case, a brake could be used to bring the transmission to a halt quickly to reduce the time to shift the transmission to a new speed ratio.

In any form taken by the invention, the important feature is the locking of the element that changes the drive ratio of the transmission when the transmission is operating and the unlocking thereof only when the transmission is halted.

It will be understood that the present invention is susceptible to modification in order to adapt it to different usages and conditions, and, accordingly, it is desired to comprehend such modifications within the purview of the present invention.

I claim:
1. In combination; a shiftable transmission having rotatable input and output shaft means and also having drive means drivingly interconnecting said shafts and including a part shiftable to change the drive ratio of the transmission, a movable member operatively connected to said shiftable part and movable for accomplishing the shifting thereof, lock means operable for locking said movable member against movement, control means operatively connected to said lock means for actuating said lock means to release said movable member, said control means including an actuating element sensitive to rotation, said actuating element being drivingly connected to one of said shaft means of the transmission so as to be influenced by rotation of the said one shaft means, said actuating element being operable only when said one shaft means is halted to permit said control means to actuate said lock means to release said movable member for shifting of the said shiftable part of said transmission.

2. In combination; a shiftable change speed transmission including a drive train having a rotary member which rotates when the transmission is operating and which halts when the transmission is halted, shiftable means in the transmission shiftable for changing the drive ratio thereof, a movable element operatively connected with said shiftable means operable for effecting the shifting thereof, means connected with said rotary member sensitive to the halting of said transmission for creating a signal, locking means for locking said movable element against movement, and means responsive to said signal for unlocking said locking means whereby shifting of said shiftable means can be effected only when said rotary member is halted.

3. In combination; a shiftable geared transmission including a rotary member which rotates when the transmission is operating and which halts when the transmission is halted, a movable element operatively connected with the gears of said transmission and movable for effecting the shifting of the gears thereof to change the drive ratio of the transmission, lock means associated with said movable element, a zero speed electric switch connected with said rotary member to be rotated thereby, said zero speed switch being operable to develop a signal upon the halting of said rotary member, an electric circuit controlling said lock means, said switch being in said circuit, and said circuit being responsive to the said signal from said switch for releasing said lock means to permit movement of said movable element whereby movement of said movable element is prevented whenever the transmission is operating and is permitted only when the transmission is at a complete halt.

4. In combination; a machine tool having a shiftable change speed geared transmission, said transmission including a rotary member which rotates when the transmission is operating and which halts when the transmission is halted, a shift lever operatively connected with the gears of said transmission movable for effecting the shifting of the gears thereof to change the drive ratio of the transmission, lock means associated with said shift lever for locking the lever against movement, a zero speed switch connected with said rotary member for being driven thereby, electrically operable means for causing release of said lock means, and in circuit with said switch, and means sensitive to the halting of said zero speed switch for controlling said electrically operable means to cause release of said lock means and also sensitive to rotation of said switch to cause locking of said lock means.

5. In combination; a machine tool having a shiftable transmission that includes a rotary member which rotates when the transmission is operating and which halts when the transmission is halted, a shift lever associated with said transmission and movable for changing the drive ratio of the transmission, a brake effective for holding said shift lever against movement, a zero speed switch connected with said rotary member for being driven in rotation thereby, electrical means for operating said brake, and a circuit for controlling said electrical means and including therein said switch, said switch being operable only when at a complete halt for influencing said circuit to cause actuation of said electrical means to release said brake so as to permit shifting of said shift lever only when the transmission is at a complete halt.

6. In combination; a machine tool having a shiftable transmission and including a rotary member which rotates when the transmission is operating and which halts when the transmission is halted, a shift lever operable when moved for shifting said transmission to change the drive ratio thereof, lock means associated with said shift lever for locking the lever against movement, a zero speed switch connected with said rotary member for being driven thereby, electrical means for actuating said lock means, and an electric circuit including therein said electrical means and said switch, said circuit being effective only when said rotary member and therefore said switch is halted for actuating the said electrical means to release said lock means thereby permitting shifting of said lever only when said transmission is at a complete halt.

7. In combination; a shiftable transmission including a rotary member that rotates only when said transmission is operating, a shift lever operatively associated with the transmission movable for effecting the shifting thereof to change the transmission drive ratio, brake means associated with said lever normally spring biased into engagement with said lever to hold the same against movement, electrical actuator means associated with said brake means energizable for releasing the brake means, a zero speed switch driven by said transmission, an electric circuit interconnecting said zero speed switch with said electrical actuator means operable to cause energization of said electrical actuator means only upon halting of said transmission whereby movement of said shift lever is possible only when the transmission is at a complete halt.

8. In combination; a shiftable transmission including a rotary member that rotates only when said transmission is operating, a shift lever associated with the transmission movable for effecting the shifting thereof, brake means associated with said lever normally spring biased into engagement with said lever to hold the same against movement, electrical actuator means associated with said brake means energizable for releasing the brake means, a zero speed switch driven by said rotary member of said transmission, and electrical circuit means including therein said switch and operable to cause energization of said electrical actuator means only upon halting of said rotary member of said transmission whereby movement of said shift lever is possible only when the transmission is at a complete halt, said switch being normally open and closing only when it comes to a halt, said switch embodying means delaying the closing thereof in response to the halting of the switch.

9. In combination; a machine tool having a shiftable transmission including a frame and a rotary member, a shift lever means mounted on said frame and operatively connected with the transmission and movable for effecting the shifting thereof to change the drive ratio thereof, elements of a positive detaining means arranged between said shift lever means and said frame and normally operable for preventing movement of said shift lever means, electrical means pertaining to said detaining means energizable for actuating said detaining means to release said shift lever means, a zero speed switch connected to said rotary member for being driven thereby, and an electric circuit including said electrical means and said zero speed switch and operable only upon the zero speed switch coming to a halt for effecting energization of said electrical means.

10. In combination; a machine tool having a shiftable transmission including a frame and a rotary member, a shift lever means mounted on the frame and operatively connected with the transmission and movable for effecting the shifting thereof to change the drive ratio of the transmission, elements of a positive detaining means arranged between said shift lever positive detaining means arranged between said shift lever means and said frame and normally operable for preventing movement of said shift lever means, electrical means operatively connected to said detaining means energizable for actuating said detaining means to release said shift lever means, a zero speed switch connected to said rotary member for being driven thereby, an electric circuit including said electrical means and said zero-speed switch and operable only upon the zero speed switch coming to a halt for effecting energization of said electrical means, said electric circuit including relay means having blade means in circuit with said electrical means, and said relay means having coil means in circuit with said zero speed switch.

References Cited by the Examiner
UNITED STATES PATENTS

| | | | |
|---|---|---|---|
| 1,772,944 | 8/30 | Glosh | 192—129.2 |
| 2,844,239 | 7/58 | Batson et al. | 192—136 |
| 3,000,230 | 9/61 | Froslie | 74—472 |

DON A. WAITE, *Primary Examiner.*